US 9,454,539 B1
Sep. 27, 2016

(12) United States Patent
Shuai et al.

(54) SYSTEM AND METHOD FOR PROTECTING OPERATING SYSTEM ZONES

(71) Applicant: CA, Inc., Islandia, NY (US)

(72) Inventors: Ran Shuai, Beijing (CN); Xiaopin Wang, Beijing (CN); Shisheng Liu, Beijing (CN)

(73) Assignee: CA, Inc., New York, NY (US)

( * ) Notice: Subject to any disclaimer, the term of this patent is extended or adjusted under 35 U.S.C. 154(b) by 484 days.

(21) Appl. No.: 13/801,321

(22) Filed: Mar. 13, 2013

(51) Int. Cl.
*G06F 17/00* (2006.01)
*G06F 17/30* (2006.01)

(52) U.S. Cl.
CPC ......... *G06F 17/30165* (2013.01); *G06F 17/00* (2013.01)

(58) Field of Classification Search
CPC .. G06F 3/067; G06F 3/0656; G06F 11/2056; G06F 11/1451; G06F 11/1458; G06F 11/1469; G06F 11/1435; G06F 11/1448; G06F 2211/1028; G06F 17/30; G06F 17/30067; G06F 11/30091
USPC ........ 707/E17.01, 822, 823, 999.2, 999.001, 707/648
See application file for complete search history.

(56) References Cited

U.S. PATENT DOCUMENTS

| 7,194,731 B1* | 3/2007 | Cantrill ............... G06F 11/3636 700/5 |
| 2003/0158873 A1* | 8/2003 | Sawdon et al. ............... 707/204 |
| 2008/0228834 A1* | 9/2008 | Burchall et al. .............. 707/202 |
| 2010/0174690 A1* | 7/2010 | Marcotte ....................... 707/695 |
| 2013/0179480 A1* | 7/2013 | Agarwal et al. .............. 707/822 |
| 2014/0046900 A1* | 2/2014 | Kumarasamy et al. ....... 707/620 |
| 2014/0297595 A1* | 10/2014 | Larson et al. ................ 707/648 |

* cited by examiner

*Primary Examiner* — Robert Beausoliel, Jr.
*Assistant Examiner* — Pedro J Santos
(74) *Attorney, Agent, or Firm* — Pillsbury Winthrop Shaw Pittman LLP

(57) ABSTRACT

A system, method, and computer-readable storage medium having a computer-readable instruction thereon to replicate transactions in a Zettabyte File System (ZFS). The method includes operations including determining, using a tracing module, a commitment of a current file transaction to a disk, obtaining when a probe function associated with the current file transaction is triggered, the current file transaction, recording a data change contained in the current file transaction, registering a callback function and a reference to the data change contained in the current file transaction after the commitment of the current file transaction, and sending the data change to a remote server.

24 Claims, 4 Drawing Sheets

SYSTEM AND METHOD FOR PROTECTING OPERATING SYSTEM ZONES

BACKGROUND

The Solaris 11 Zone software is a lightweight virtualization technology offered by the Solaris operating system ("Solaris") provided by Oracle Corporation of Redwood Shores, Calif. With virtualized zones, end users are able to create multiple Solaris servers within a single physical Solaris server.

BRIEF SUMMARY

There is provided, for example, a system, method, and computer-readable storage medium to protect zones in an operating system during data replication. In some implementations, there is provided a system, method, and computer-readable storage medium having one or more computer-readable instructions thereon to replicate transactions in a Zettabyte File System (ZFS) in a computing system using an operating system (e.g., the Solaris 11 operating system). The method is executed by one or more processors that perform one or more operations. The operations comprise determining, using a tracing module, a commitment of a current file transaction to a disk, the commitment comprising an operation in which data is written to the disk, the tracing module comprising a probe function associated with the current file transaction to monitor the current file transaction, the probe function being triggered and called by the tracing module when the commitment occurs; obtaining, when the probe function is triggered, the current file transaction placed in a stack of a memory device of the computing system; recording a data change associated with the current file transaction; registering, in response to recording the data change, a callback function and a reference to the data change associated with the current file transaction, wherein the callback function is automatically called by the operating system in response to the commitment of the current file transaction; and sending, in response to the call by the operating system of the callback function, the data change to a remote server.

In some implementations, a system to replicate transactions in a Zettabyte File System (ZFS) in a computing system using an operating system is provided. The system comprises one or more processors that are configured to determine, using a tracing module, a commitment of a current file transaction to a disk, the commitment comprising an operation in which data is written to the disk, the tracing module comprising a probe function associated with the current file transaction to monitor the current file transaction, the probe function being triggered and called by the tracing module when the commitment occurs; obtain, when the probe function is triggered, the current file transaction placed in a stack of a memory device of the computing system; record a data change associated with the current file transaction; register, in response to recording the data change, a callback function and a reference to the data change associated with the current file transaction, wherein the callback function is automatically called by the operating system in response to the commitment of the current file transaction; and send, in response to the call by the operating system of the callback function, the data change to a remote server.

In some implementations, a computer program product comprising a non-transitory computer readable storage medium comprising computer readable program code embodied therewith to replicate transactions in a Zettabyte File System (ZFS) in a computing system using an operating system is provided. The computer readable program code comprises computer readable program code configured to determine, using a tracing module, a commitment of a current file transaction to a disk, the commitment comprising an operation in which data is written to the disk, the tracing module comprising a probe function associated with the current file transaction to monitor the current file transaction, the probe function being triggered and called by the tracing module when the commitment occurs; computer readable program code configured to obtain, when the probe function is triggered, the current file transaction placed in a stack of a memory device of the computing system; computer readable program code configured to record a data change associated with the current file transaction; computer readable program code configured to register, in response to recording the data change, a callback function and a reference to the data change associated with the current file transaction, wherein the callback function is automatically called by the operating system in response to the commitment of the current file transaction; and computer readable program code configured to send, in response to the call by the operating of the callback function, the data change to a remote server.

The instructions when executed by one or more processors cause the one or more processors to determine, using a tracing module, a commitment of a current file transaction to a disk, the commitment comprises an operation in which data is written to the disk, insert in the tracing module a probe function associated with the file transaction to monitor the current file transaction, the probe function being triggered and called by the tracing module when the commitment occurs, obtain, when the probe function is triggered, the current file transaction placed in a stack of a memory device of the computing system, record a data change associated with the current file transaction, register, after recording the data change, a callback function and a reference to the data change contained in the current file transaction such that the registered callback function is automatically called by the operating system after the commitment of the current file transaction, and send, when the callback function is called by the operating system, the data change to a remote server.

Various other objects, features, and advantages of the invention will be apparent through the detailed description and the drawings attached hereto. It is also to be understood that both the foregoing general description and the following detailed description are exemplary and not restrictive of the scope of the invention.

DETAILED DESCRIPTION

Figure 1:
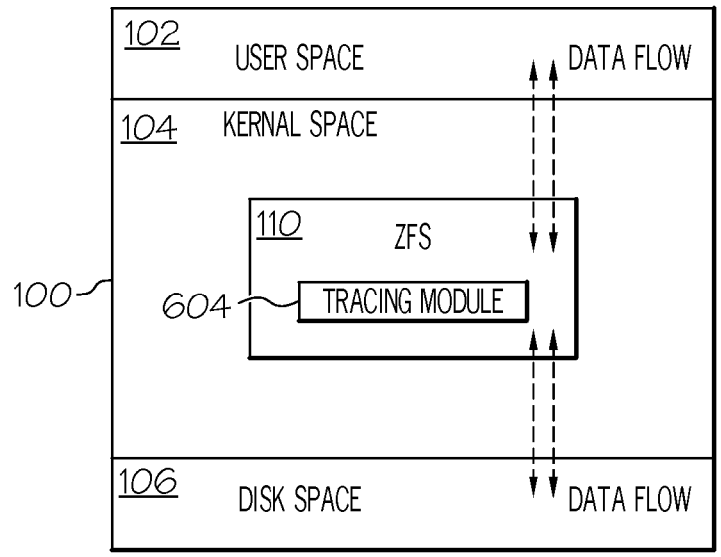
FIG. 1 is an illustration of an example computing system for protecting zones of a file Zettabyte File System (ZFS) of an operating system, according to various implementations.

As discussed above, the Solaris 11 Zone software is a lightweight virtualization technology. With virtualized zones, end users are able to create multiple Solaris servers within a single physical Solaris server. Though a server matrix constructed by zones works well most of the times, accidents may happen, for example, when for some reason one zone fails to respond to a user request, which causes malfunctioning of the entire server matrix. Further, in another example failure scenario, the physical Solaris server itself may be powered off by unexpected interference from another electrical device. In such failure or malfunction scenarios, data replication provides disaster recovery and/or high availability service to zones. Unfortunately, conventional Solaris 11 deployments do not provide a process to achieve trustworthy protection of zones from such accidents with robust data integrity and replication between zones. These and other drawbacks exist. In some implementations, these and other drawbacks of existing systems are addressed.

The Solaris 11 operating system is a Unix based operating system, provided by Oracle Corporation of Redwood Shores, Calif. In some implementations, the Solaris 11 operating system resides in a memory space in a computing system 100 (e.g., a server). Computing system 100 may be any computing device that includes one or processors or CPUs, memory devices, buses, interfaces, and other hardware suitable to provide computing services to users connected to computing system 100. For example, computing system 100 may be a stationary hardware computing server or a mobile computing device, as may be contemplated by one of ordinary skill in the art in view of this disclosure. In some implementations, the memory devices in computing system 100 provide a memory space that is divided into a user space 102, a kernel space 104, and a disk space 106. Data flow, shown by chained arrows occurs between user space 102 and disk 106, and vice-versa, via kernel space 104.

As is known to one of ordinary skill in the art, user space 102 supports various dynamic programming languages, user executable files, libraries, software and system interfaces. Disk space 106 supports various hardware, such as hard disks and other storage devices used for storing data received from user space 102 and kernel space 104.

Kernel space 104 supports, among other items, file systems, memory allocation tables, device drivers, and schedulers. In some implementations, kernel space 104 supports a Zettabyte File System (ZFS™) 110 introduced in Solaris 11 operating system as a combined file system and a logical volume manager designed from the ground up to deliver a general-purpose file system that spans from the desktop to the datacenter. Loss of important files, running out of space on a partition, time consuming operations to add new storage to servers, growing or shrinking a file system, or data corruption are some limitations facing traditional file systems and volume managers. ZFS 110 addresses these challenges efficiently and with minimal manual intervention. The Solaris 11 operating system includes advanced storage features such as built-in de-duplication, encryption, compression, and thin provisioning that make ZFS 110 technology an appropriate storage foundation for virtualized and cloud computing environments. ZFS 110 is a 128 bit system, and therefore it can address 1.84×1019 times more data than 64-bit systems such as New Technology File System (NTFS) provided by Microsoft Corporation of Redmond, Wash. ZFS 110 depends on a storage pool mechanism called "zpool," known to one of ordinary skill in the art, to dynamically extend storage space of a ZFS instance, as discussed below in FIG. 4. In some implementations, operations that are modified during execution on ZFS 110 are bunched together in transactions before being committed to disk. In some implementations, these transactions are arranged as file transactions in the Solaris 11 operating system. Thus, related changes or operations (e.g., write 100 bytes, and close the file) are put together into a transaction, which is a type of data structure, and either the whole transaction completes or fails to complete. In some implementations, transactions are part of the kernel structure formed by kernel space 104. In some implementations, ZFS 110 provides a "Copy-on-Write" transaction model where input-output (I/O) data changes that go into a ZFS instance are managed as transactions. The I/O data changes may be passed as parameters to different probe functions. As a result, live data is never overwritten and chances of data corruption are reduced.

In the Solaris 11 operating system architecture, virtual instances of the operating system having partitions for the operating system are known to one of ordinary skill in the art as zones. Every zone is based directly on a corresponding ZFS instance and has a one-to-one relationship with the corresponding ZFS instance. Zones provide operating system level virtualization technology built into the Solaris 11 architecture, for example, based upon respective size of each zones. Using flexible, software-defined boundaries to isolate software applications and services, zones allow multiple private execution environments to be created within a single instance of a Solaris 11 environment. System administrators can meet changing requirements by quickly provisioning new zones, or moving them from system to system or disk to disk within the same system as capacity or configuration needs change.

ZFS 110 includes a tracing module (e.g., tracing module 604 described below in FIG. 6) that provides a comprehensive dynamic tracing framework for the Solaris operating environment. In some implementations the tracing module is a script implemented using a tool "DTrace" that provides a powerful infrastructure to permit administrators, developers, and service personnel to concisely answer arbitrary questions about the behavior of the operating system and user programs. DTrace provides a comprehensive view of the entire system, from kernel to application. DTrace may be used when troubleshooting systemic problems or diagnosing performance bottlenecks—in real time as well as on the fly. As opposed to individual analysis tools for each of user space 102, kernel space 104, and disk space 106, DTrace may be used as a single tool to monitor all the three spaces and provide a unified output obtained from such monitoring. That is, using DTrace, the complete software stack and hardware state/processes may be monitored for computing system 100. For example, DTrace tracing module may be used to monitor transactions in and between various zones shown in FIG. 2.

DTrace includes instrumentation points called probes or probe functions. Probes aid DTrace tool to collect data and monitor system performance. An example probe name is in the format of a four-tuple: provider:module:function:name. In a command line interface, tracing probes may be invoked by typing "dtrace-n probename," where "probename" is the name of the probe function. In some implementations, a Function Boundary Tracing (FBT) probe function is inserted into DTrace tracing module for monitoring various file transactions. A transaction is a way by which ZFS 110 may view I/O changes, whenever ZFS 110 needs to commit some file system changes into a corresponding disk (e.g., disk space 106). In such situations, ZFS 110 encapsulate the I/O changes into transactions. However, the processing of transactions is done by calling some system functions. FBT probe is used for monitoring function calls, for almost every system function, and allows ZFS 110 to monitor the function calling. All such information, taken together means that by using FBT monitoring ZFS 110 may know exactly when a transaction is being committed and what the transaction contains since FBT, when capturing a function call, is also able to trace parameters passed to that function.

Figure 2:
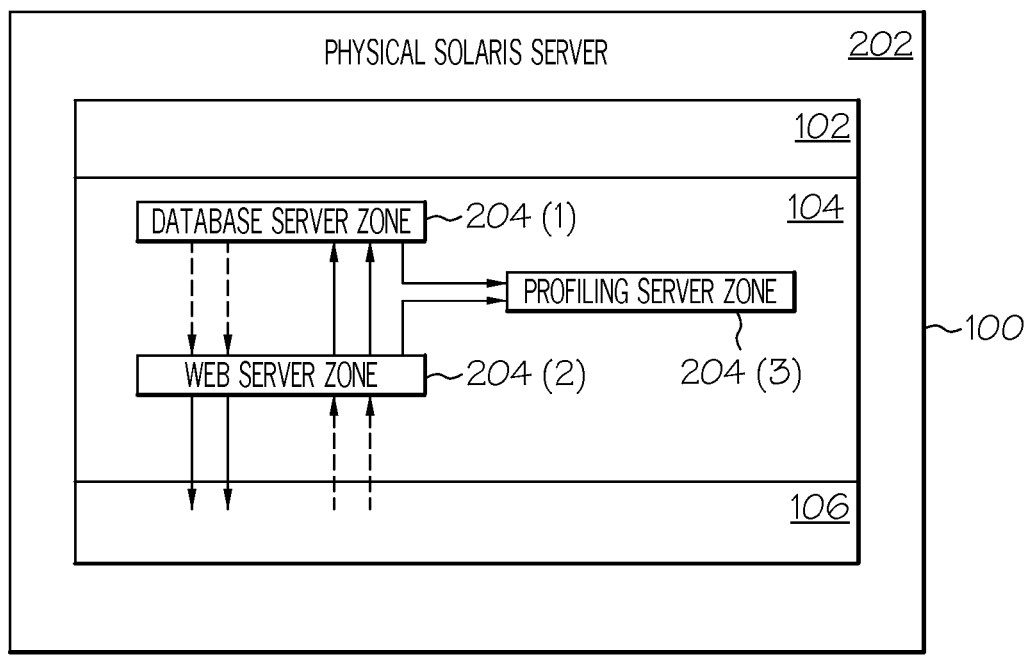
FIG. 2 is an illustration of an example of server zones in computing system, according to various implementations.

FIG. 2 illustrates an example of different zones grouped together on a physical Solaris 11 server, for example, to provide web service to end users. In some implementations, computing system 100 includes a physical Solaris server 202. Physical Solaris server 202 includes different zones, for example, a database server zone 204(1), a web server zone 204(2), and a profiling server zone 204(3), in addition to standard server hardware and software. In some implementations, physical Solaris server 202 may not be part of computing system 100, and may be a standalone computing device that may communicate with computing system 100. In some implementations, physical Solaris server 202 is computing system 100 in and all by itself. Chained arrows in FIG. 2 illustrate data flow between database server zone 204(1), web server zone 204(2), and profiling server zone 204(3). As may be contemplated by one of ordinary skill in the art, such data flow may be from user space 102 to disk 106 and vice versa, via kernel space 104 in a memory device of computing system 100 or physical Solaris server 202.

Figure 3:
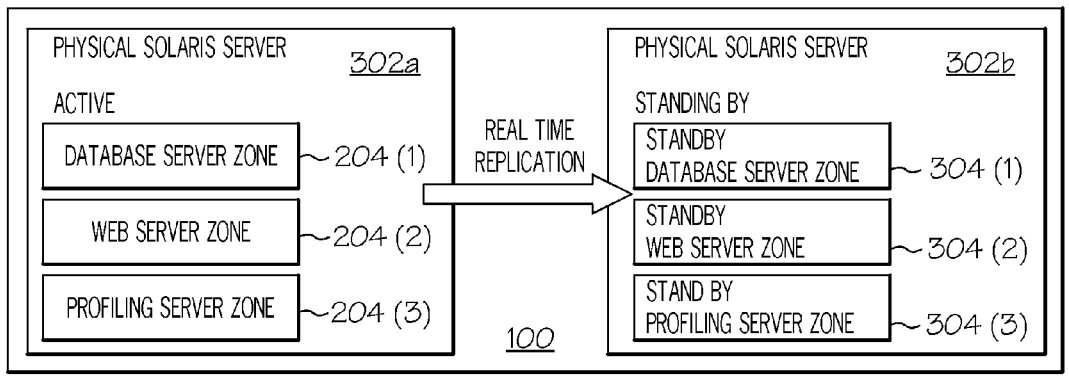
FIG. 3 is an illustration of an example scenario for real time data replication, according to various implementations.

FIG. 3 illustrates an example of a scenario where zones may be used for data replication to provide disaster recovery and/or high availability to zones. Such data replication may be useful when there are unexpected and/or undesirable events that cause data in the original zone to get corrupt. In some implementations, computing system 100 may include more than one physical Solaris server, for example, an active physical Solaris server 302a and a standby physical Solaris server 302b. In some implementations, data from database server zone 204(1), web server zone 204(2), and profiling server zone 204(3) is replicated in real-time to corresponding standby database server zone 304(1), standby web server zone 304(2), and standby profiling server zone 304(3), respectively, in standby physical Solaris server 302b, although other numbers and types of zones may be present. In some implementations, such data replication may not be real-time and may be done offline at a later time when computing system 100 is not in use by a user. However, conventional implementations of ZFS 110 do not provide any guidance or disclosure for achieving such data replication with consistency not only for data stored in a certain zone but for data distributed in different zones, and for flexible recoverability that ensures that replicated data may be reverted to any point in history for all zones.

Figure 4:
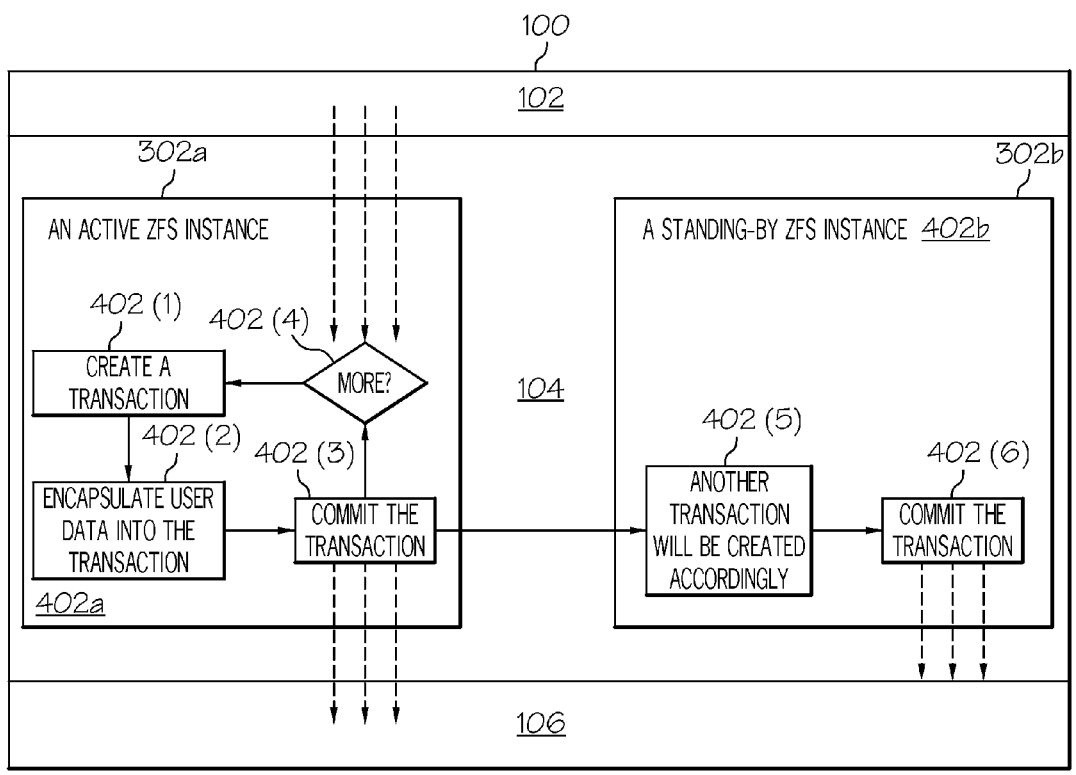
FIG. 4 is an illustration of a process for data replication between ZFS instances upon commitment of a file transaction, according to various implementations.

FIG. 4 illustrates an active ZFS instance 402a created in active physical Solaris server 302a on which zones 204(1)-204(3) are supported. When data has to be replicated to one or more zones in standby physical Solaris server 302b, correspondingly a standby ZFS instance 402b is created in standby physical Solaris server 302b. FIG. 4 illustrates operations 402(1)-402(6) that occur in computing system 100 for carrying out a process of protecting zones 204(1)-204(3) by data replication to zones 304(1)-304(3), respectively, in standby physical Solaris server 302b. In some implementations, standby ZFS instance 402b may be physically separate from computing system 100 in a different or remote computing system. In some implementation, standby ZFS instance 402b may be in a memory space separate from memory space of active ZFS instance 402a of computing system 100.

In an operation 402(1), a file transaction is created corresponding to data received from user space 102 (belonging to one or more zones 204(1)-204(3)). In an operation 402(2), user data is encapsulated into the current file transaction. In an operation 402(3), the transaction is committed to disk space 106. As soon as the transaction is committed, contents thereof are transferred to standby ZFS instance 402b, and in particular to one or more zones supported by standby ZFS instance 402b. Subsequently, in an operation 402(5) occurring at standby physical Solaris server 302b and supported by standby ZFS instance 402b, a duplicate transaction is created to provide data replication. In an operation 402(6), the duplicate transaction is committed to disk space 106.

In some implementations, a creation event of the file transaction is hooked and at least the following operations are performed: (a) when the current file transaction is determined to be ready for commitment to disk space 106, all I/O data contained by the current file transaction is collected and stored in a memory device of computing system 100; and (b) the collected I/O is sent to a remote replica of physical Solaris server 302a (e.g., standby physical Solaris server 302b), only when the current file transaction has been committed to disk space 106. The term "hooked" relates to the file transaction being captured or intercepted, so between the interception and resumption of the process, other operations can be performed by ZFS 110.

To hook the commitment event of the current file transaction to disk space 106, a tracing module (e.g., DTrace) is used. As noted earlier, DTRACE is a proprietary tracing architecture embedded in Solaris kernel used for letting developers or administrators detect behavior of kernel space 104 of computing system 100, e.g., a workflow of a system call. Conventionally, a script written in the "D" programming language is developed and executed to trigger DTRACE. However, in some implementations, a kernel module in kernel space 104 of computing system 100 directly creates and inserts the probe function into the probe list of the DTRACE kernel module that is developed and executed. The kernel module referred here is created by ZFS 110 and once loaded will run as a part of kernel process. All behaviors relating to the kernel process belong to kernel space. The probe function that is created inserts a breakpoint at the entry point of a Data Management Unit (DMU) function referred to as "dmu_tx_commit" function. DMU belongs to another kernel module that is running in kernel space. Whenever a transaction, including the current file transaction is committed, this function is called. The dmu_tx_commit function is an existing Solaris 11 kernel function. For example, the declaration for the dmu_tx_commit is: void dmu_tx_commit (dmu_tx_t *tx), where "dmu_tx_t*tx" is a parameter that is passed by the dmu_tx_commit function. The dmu_tx_t*tx is a pointer to a transaction (e.g., the current file transaction). The dmu_tx_commit function is monitored by the probe function. As discussed earlier, the probe here is one that is managed by Dtrace mechanism. A probe may be created by Dtrace mechanism and by specifying what to do in the probe, Dtrace mechanism will do exactly as a user of ZFS 110 requests. For example, while creating the probe a user may specify that every call to the function dmu_tx_commit needs to be monitored, and Dtrace mechanism will accordingly insert a break at the beginning of the function so every time the function is called, Dtrace will know and may then inform the probe. In the probe, a user or ZFS 110 may carry out operations based upon the received information. The "dmu" function deals with the current file transaction referred to by "tx." The current file transaction is committed to deeper lays of system IO architecture, e.g., to disk space 106. For example, a transaction involving writing of data, a commit means writing data to disk space 106. Such kernel behavior is similar to a database transaction being committed to hardware storage.

In addition to creating and inserting the probe function, a callback function is registered into DTRACE module so that once the probe function is triggered, DTRACE will inform the kernel module by calling the callback function. When a probe is defined, it tells the Dtrace mechanism about its existence, and what it wants to do. This process is known as "registering." "Triggering" relates to a function being called, for example, by ZFS 110. "Informing" relates to the calling of the kernel module's function by Dtrace so that the kernel module will then know that something it is expecting happened. The callback function, once called, carries out the following operations using one or more processors in computing system 100. In some implementations, a stack segment of kernel process is browsed and a memory address of the current file transaction is determined or found from the stack segment or stack. Based on the found memory address in the stack, a pointer pointing at the current file transaction is created by the callback function.

Subsequently, a DMU function "dmu_tx_callback_register" is called to register another callback function, as well as a pointer pointing to previously collected I/O data into the callback functions list of transactions, including the current file transaction. The function "dmu_tx_callback_register" is an existing Solaris kernel function, and its declaration is:
void dmu_tx_callback_register(dmu_tx_t *tx, dmu_tx_callback_func_t *func, void *data)

The main responsibility of this function is to connect a transaction (referred to by "tx") with a function (referred to by "func"), so later after the transaction being processed, the registered function will be called. The third parameter "data" is a void pointer that can point to any data specified by the caller of "dmu_tx_callback_register". A data pointer such as "void *data" is used because when a user of computing system 100 registers a callback function into a transaction (e.g., the current file transaction), and later when that callback function is triggered, the user may want that callback function being passed some information that is collected before "dmu_tx_callback_register" is called.

In some implementations, "data" will point to data changes collected before "dmu_tx_callback_register" is called. When the callback function is triggered, Solaris kernel space 104 will transfer the "data" to the callback function and inform the callback function that there is information saved by the original callback function that registered the callback function with the current file transaction. Since the callback function points to data changes of the transaction, the callback function will perform a replication operation with the data, and the changes will be replicated to a remote server.

Every ZFS 110 file transaction, including the current file transaction, has a list of callback functions, and every callback function in the list will invariably be called after that transaction is committed. When a callback function is called, the current file transaction is ensured to have been successfully committed and the collected I/O data of the current file transaction can be sent to remote replica, e.g., standby ZFS instance 402b in standby physical Solaris server 302b. In some implementations, remote replica may be physically separate from computing system 100. In some implementations, remote replica may be physically separate but still reside within computing system 100, e.g., at a different memory location.

Figure 5:
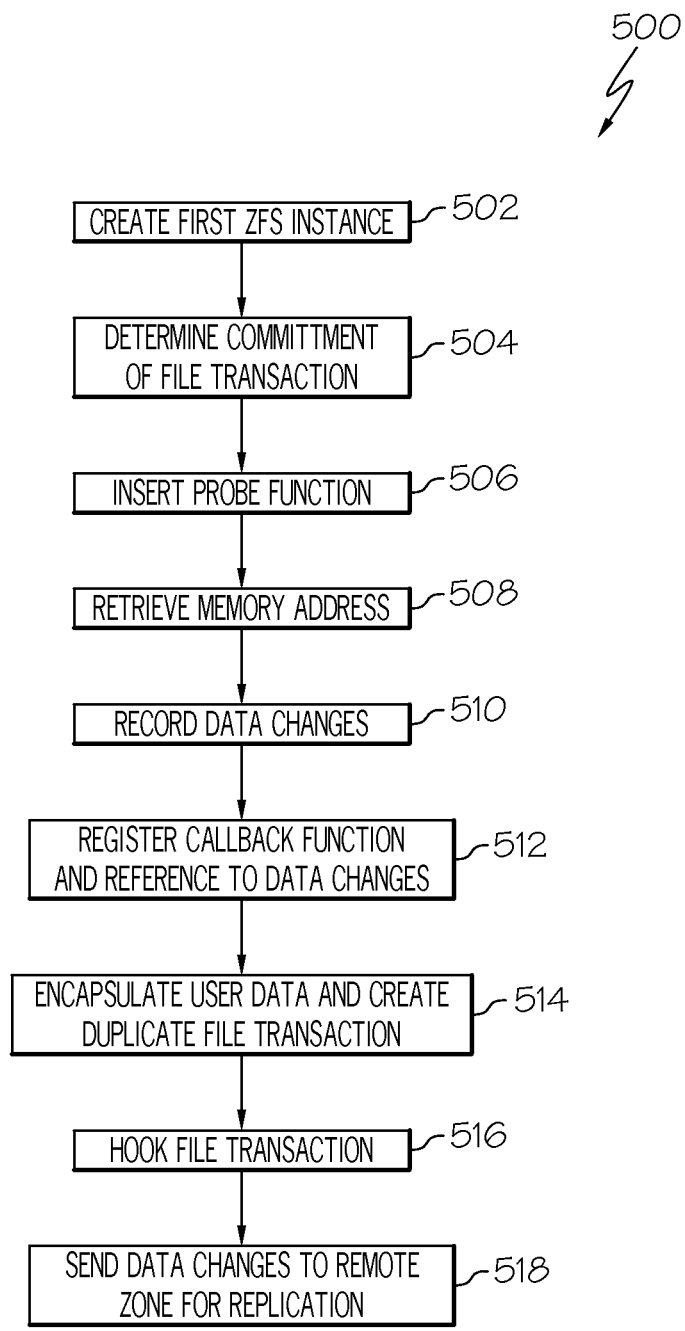
FIG. 5 is a flowchart of a process for replicating transactions in the ZFS of computing system 100, according to various implementations.

Referring now to FIG. 5, an example process 500 for protecting zones in ZFS 110 of a Solaris 11 operating system is described, although various implementations may be used in other similar operating systems (e.g., various versions of open sourced UNIX, or WINDOWS® operating system provided by Microsoft Corporation of Redmond, Wash.), after modification, as may be contemplated by one of ordinary skill in the art. In some implementations, process 500 is carried out by one or more processors in computing system 100, for example, in kernel space 104 of a memory in computing system 100.

Process 500 begins in an operation 502 where the one or more processors of computing system 100 create a first ZFS instance (e.g., active ZFS instance 402a) in kernel space 104 of computing system 100 for supporting the current file transaction. A ZFS instance is created by a Solaris command, but when a user of the Solaris 11 operating system created a non-global zone following zone-creating process, a ZFS instance will be automatically created.

In an operation 504, one or more processors of computing system 100 determine whether or not a commitment of the current file transaction has been initiated, for example, by another process or a user of computing system 100. In some implementations, the one or more processors may determine whether or not the current file transaction has been committed to disk space 106. In some implementations, the current file transaction includes a list of callback functions, each callback function in the list being called when the current file transaction is committed by the Solaris 11 operating system automatically. In some implementations, as part of the determining process, input-output (IO) data associated with the current file transaction is collected for storage in a memory device of computing system 100. In some implementations, the determining is carried out using a tracing module, e.g., the DTrace module of the Solaris 11 operating system. Whether a transaction has been committed can be determined, for example, by adding a callback function into the list of callback functions. If a callback function is inserted into this callback function list, later, when the transaction is done (i.e., committed to disk space 106), the callback function will be called by the Solaris system. So, in this way ZFS 110 would know that the transaction is finished.

In an operation 506, one or more processors of computing system 100 insert, in the tracing module, a probe function associated with the current file transaction for monitoring the current file transaction upon the commitment. The probe function is triggered and called by the tracing module when the commitment occurs. The probe function monitors data changes associated with the current file transaction by inserting a breakpoint in the current file transaction using the probe function when the commitment occurs. Breakpoint here refers to a code similar to an interceptor. Conventionally, Solaris engineers have to manually embed such kind of interceptors into most Solaris system functions. Initially, at the beginning of the transaction, those interceptors are inactive, but a user can activate them using Dtrace mechanism. For example, by using certain commands known to one of ordinary skill in the art, the user can inform Dtrace mechanism that the calling of a specific system function is to be intercepted. Dtrace will then enforce user's intention by activation of a corresponding interceptor, and inserting a breakpoint here is similarly understood as something similar to activation of an already existing interceptor within a function.

In an operation 508, the one or more processors in computing system 100 obtain or retrieve, when the probe function is triggered, the current file transaction placed in a stack of a memory device of computing system 100. In some implementations, such triggering means obtaining the memory address of the transaction. In some implementations, the probe function creates a pointer to the file transaction based upon a memory address associated with a position in the stack in the memory device where the current file transaction is placed.

In an operation 510, the one or more processors of the computing system 100 record data changes contained in the current file transaction, e.g., in a memory device of computing system 100.

In an operation 512, the one or more processors of computing system 100, after recording the data changes a callback function and a reference to the data changes contained in the current file transaction are registered with kernel space 104 such that the registered callback function is automatically called by the Solaris 11 operating system after the commitment of the current file transaction is complete. In some implementations, the probe function calls a system register function (e.g., "dmu_tx_callback_register" function discussed above) that registers an additional callback function and an additional pointer to input-output (IO) data collected during one or more commitments prior to the commitment of the file transaction to disk space 106. Unlike the former callback function calling, this callback is to be inserted into a callback function list of the transaction. All functions in the callback function list will be called by system one after another once that transaction has been committed into the disk. In some implementations, the Solaris 11 operating system automatically passes the reference of the data changes to the callback function when the callback function is called, as part of standard system behavior. When inserting that callback function into the callback function list, ZFS 110 calls a system function which not only allows inserting the function into the list but also allows passing a memory pointer to ZFS 110. When sometime in the future that callback function is called, ZFS 110 will pass the pointer to that callback function as one of is parameter though ZFS 110 may know nothing about what the pointer points to. However, the pointer points to memory address of those previously collected data changes.

In an operation 514, the one or more processors of computing system 100 encapsulate user data into the current file transaction for the sending, and create a duplicate file transaction in a second ZFS instance (e.g., a standby ZFS instance 402b) prior to the commitment for storing or recording the data changes. User data is encapsulated by defining a data structure. In some implementations, the data structure may contain at least following information: (a) which file the data is about; (b) offset of the data; (c) length of the data; and (d) a contiguous memory array containing the data. A duplicate transaction will be available by creating a structure of type—"Transaction", following which all its attributes are filled according to the transaction that is to be replicated.

In an operation 516, the current file transaction is hooked, as described below with respect to FIG. 6.

In an operation 518, the one or more processors of computing system 100 send, when the callback function is being called by the Solaris 11 operating system, the data changes to at least one remote server for replication (e.g., standby physical Solaris server 302b). In some implementations, the sent data changes include I/O data. In some implementations, the data changes are sent by way of the callback function that was called later, i.e., the call back function that is being inserted into a callback function list of a transaction and called when that transaction is done.

Figure 6:
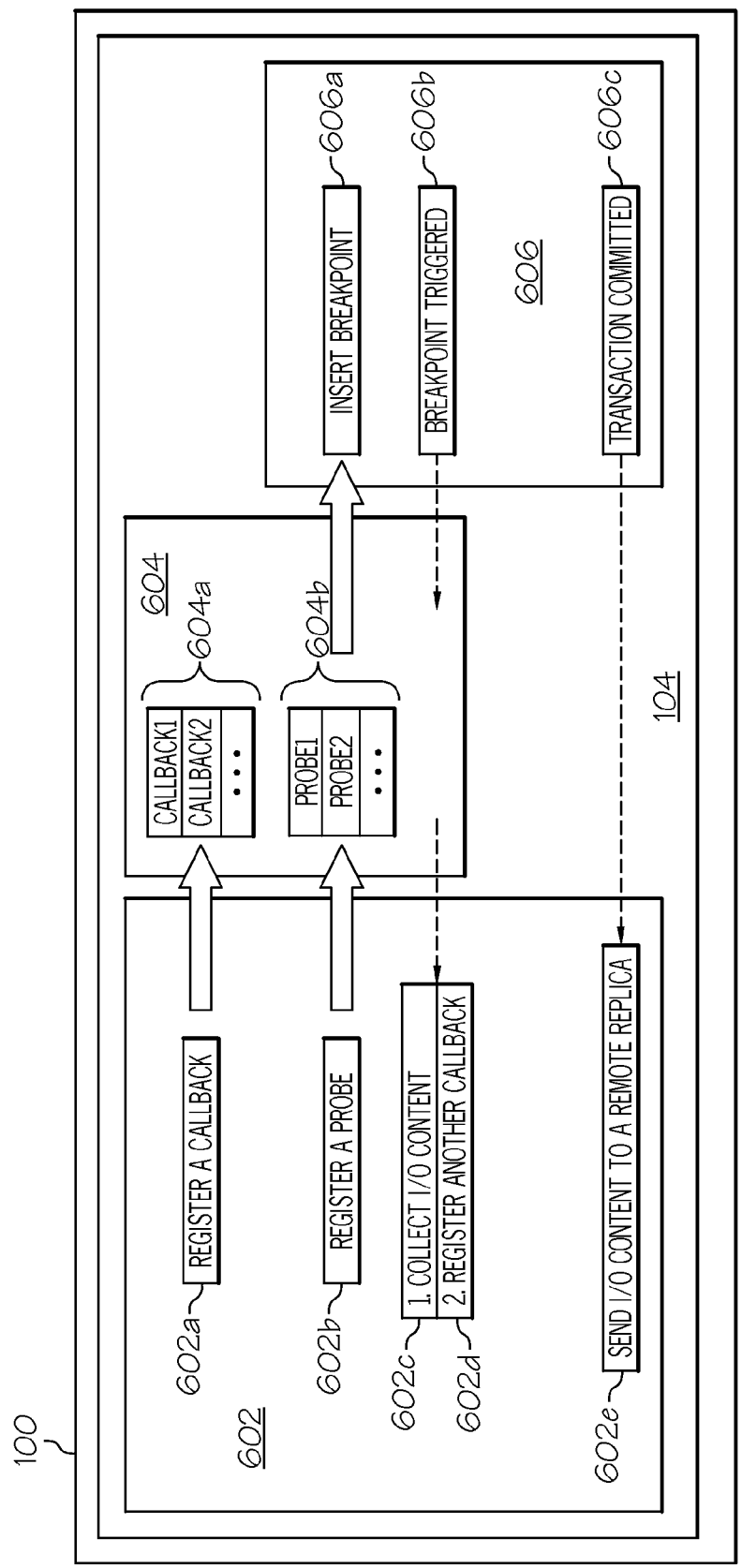
FIG. 6 is a partly schematic and partly functional diagram of hooking a ZFS file transaction, according to various implementations.

Referring to FIG. 6, an example process 600 for hooking a file transaction, including the current file transaction, in ZFS 110 of a Solaris 11 operating system is described, although various implementations may be used in other similar operating systems, after modification, as may be contemplated by one of ordinary skill in the art. In some implementations, process 600 is carried out by one or more processors in computing system 100, for example, in kernel space 104 of a memory in computing system 100. In some implementations, kernel space 104 includes a ZFS hook module 602 coupled to tracing module 604 that is coupled to ZFS module 606. ZFS module 606 is a Solaris kernel module that contains all functionalities used to realize ZFS 110 logic structure. In the Solaris 11 operating system, nearly ZFS related operation will go through this module. In some implementations, ZFS hook module 602, tracing module 604, and ZFS module 606 are included within ZFS 110 in kernel space 104. In some implementations, tracing module 604 is implemented as a modification to the DTrace module of Solaris 11 operating system, the modification accounting for various features and functionalities of the various implementations.

In some implementations, ZFS hook module 602 is configured to carry out the operations 602a-602e based upon communication from tracing module 604 and ZFS module 606. In an operation 602a, ZFS hook module 602 registers a callback function, for example, using "dmu_tx_callback_register" function discussed above. In some implementations, tracing module 604 registers callback functions 604a, including the callback function in operation 602a, as communicated by ZFS hook module 602. In an operation 602b, ZFS hook module 602 registers a probe function. In some implementations, tracing module 604 registers probe functions 604b, including the probe function in operation 602b. In some implementations, probe functions 604b include the FBT probe function discussed earlier.

In some implementations, ZFS module 606 carries out operations 606a-606b, as discussed below. In an operation 606a, based upon the registered probe functions 604b, ZFS module 606 inserts a breakpoint in the current file transaction. In an operation 606b, the breakpoint is triggered by ZFS module 606 and the triggering communicated back to tracing module 604, that forward the communication to ZFS hook module. Upon receipt of the communication regarding triggering from ZFS module 606 via tracing module 604, ZFS hook module 602 carries out operations 602c and 602d. In operation 602c, ZFS hook module 602 collects the data changes occurring in the current file transaction, for example with respect to prior file transactions, using callback functions 604a. In an operation 602d, ZFS hook module 602d registers another callback function with tracing module 604 by adding the new callback function to the list of callback functions 604a.

Independently or in parallel, in an operation 606c, ZFS module 606 commits the current file transaction to disk space 106. Upon commitment of the current file transaction, ZFS module 606 communicates the information regarding the commitment to ZFS hook module 602. In an operation 602e, upon receipt of the communication regarding the commitment of the current file transaction from ZFS module 606, ZFS hook module 602 sends I/O content (I/O data) to a remote replica (e.g., standby physical Solaris server 302b) for storage. In some implementations, standby physical Solaris server 302b maintains its own standby ZFS instance 402b to commit the current file transaction in duplicate to its own disk space.

As a result, using the various implementations, among other advantages, better data consistency and flexible recoverability may be achieved. For example, every piece of change to data is replicated to standby zones (e.g., in standby ZFS instance 402b of standby Solaris server 302b) and is completely applied to currently active zone (e.g., active ZFS instance 402a). By treating each captured transaction, including current file transaction, as a bookmark, zone administrator will be able to recover data to any point of desire. By sorting out chronological sequence of transactions captured on multiple zones, it is it is possible to replicate the whole zone server matrix validly. Further, the entire zone server matrix may be reverted to a former status with intact data consistency.

It will be appreciated that the operations in FIGS. 4-6 describe one or more implementations. However, various combinations of the operations may be used for other implementations, as will be appreciated by one of ordinary skill in the art.

Implementations described in this disclosure may be made in hardware, firmware, middleware, software, or various combinations thereof. The technology disclosed herein may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the technology, and performing certain actions. However, it will be apparent that such descriptions are merely for convenience, and that such actions may in fact result from computing devices, processors, controllers, or other devices executing firmware, software, routines or instructions.

The systems described herein are exemplary system configurations. Other configurations may exist. Those having skill in the art will appreciate that the disclosure herein may work with various configurations. Accordingly, more or less of the aforementioned system components may be used and/or combined in various embodiments. Furthermore, various operations of the methods described herein, while described in a particular order, may be performed in different orders as would be appreciated by those having skill in the art. In some embodiments, more of less of the described operations may be used.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Other implementations, uses, and advantages of the disclosed technology will be apparent to those skilled in the art from consideration of the specification and practice of the disclosure herein. The specification should be considered exemplary only, and the scope of the technology disclosed herein is accordingly intended to be limited only by any associated claims.

What is claimed is:

1. A method to replicate transactions in a Zettabyte File System (ZFS) of a computing system using an operating system, the method being executed by a processor, the method comprising:

determining, using a tracing module, a commitment of a current file transaction to a disk, the commitment comprising an operation in which data is written to the disk, the tracing module comprising a probe function associated with the current file transaction to monitor the current file transaction, the probe function being triggered and called by the tracing module when the commitment occurs;

obtaining, when the probe function is triggered, the current file transaction placed in a stack of a memory device of the computing system;

recording a data change associated with the current file transaction;

registering, in response to recording the data change, a callback function and a reference to the data change associated with the current file transaction, wherein the callback function is automatically called by the operating system in response to the commitment of the current file transaction; and sending, in response to the call by the operating system of the callback function, the data change to a remote server.

2. The method of claim 1, wherein determining the commitment of the current file transaction to the disk further comprises collecting input-output (I/O) data associated with the current file transaction for storage in the memory device, and wherein sending the data change comprises sending the I/O data.

3. The method of claim 1, wherein recording the data change associated with the current file transaction comprises inserting a breakpoint in the current file transaction using the probe function in response to the commitment.

4. The method of claim 1, further comprising creating, by the probe function, a pointer to the current file transaction based upon a memory address associated with a position in the stack in the memory device where the current file transaction is placed.

5. The method of claim 1, further comprising calling, by the probe function, a system register function that registers an additional callback function and an additional pointer to input-output (I/O) data collected in response to a commitment prior to the commitment of the current file transaction to the disk.

6. The method of claim 1, wherein the current file transaction comprises a list of callback functions, each callback function in the list being called automatically in response to automatic commitment of the current file transaction by the operating system.

7. The method of claim 1, further comprising:
creating a first ZFS instance to support the current file transaction;
encapsulating user data into the current file transaction for the sending the data change; and
creating a duplicate file transaction in a second ZFS instance prior to the commitment for the recording of the data change.

8. The method of claim 1, further comprising automatically passing, by the operating system, the reference of the data change to the callback function in response to call of the callback function, and wherein the sending the data change is carried out by the callback function.

9. A system to replicate transactions in a Zettabyte File System (ZFS) in a computing system using an operating system, the system comprising:
a hardware processor configured to:
determine, using a tracing module, a commitment of a current file transaction to a disk, the commitment comprising an operation in which data is written to the disk, the tracing module comprising a probe function associated with the current file transaction to monitor the current file transaction, the probe function being triggered and called by the tracing module when the commitment occurs;
obtain, when the probe function is triggered, the current file transaction placed in a stack of a memory device of the computing system;
record a data change associated with the current file transaction;
register, in response to recording the data change, a callback function and a reference to the data change associated with the current file transaction, wherein the callback function is automatically called by the operating system in response to the commitment of the current file transaction; and
send, in response to the call by the operating system of the callback function, the data change to a remote server.

10. The system of claim 9, wherein the processor configured to determine the commitment of the current file transaction to the disk is further configured to collect input-output (I/O) data associated with the current file transaction for storage in the memory device, and wherein the sent data change comprises the I/O data.

11. The system of claim 9, wherein the processor configured to record the data change associated with the current file transaction is further configured to insert a breakpoint in the current file transaction using the probe function in response to the commitment.

12. The system of claim 9, wherein the probe function creates a pointer to the current file transaction based upon a memory address associated with a position in the stack in the memory device where the current file transaction is placed.

13. The system of claim 9, wherein the probe function calls a system register function that registers an additional callback function and an additional pointer to input-output (I/O) data collected in response to a commitment prior to the commitment of the current file transaction to the disk.

14. The system of claim 9, wherein the current file transaction comprises a list of callback functions, each callback function in the list being called in response to automatic commitment of the current file transaction by the operating system.

15. The system of claim 9, wherein the processor is further configured to:
create a first ZFS instance to support the current file transaction;
encapsulate user data into the current file transaction for the processor to send the data change; and
create a duplicate file transaction in a second ZFS instance in response to the commitment for the processor to record the data change.

16. The system of claim 9, wherein the operating system automatically passes the reference of the data change to the callback function in response to call of the callback function, and wherein the callback function is used to send the data change.

17. A computer program product comprising:
a non-transitory computer readable storage medium comprising computer readable program code embodied therewith to replicate transactions in a Zettabyte File System (ZFS) in a computing system using an operating system, the computer readable program code comprising:
computer readable program code configured to determine, using a tracing module, a commitment of a current file transaction to a disk, the commitment comprising an operation in which data is written to the disk, the tracing module comprising a probe function associated with the current file transaction to monitor the current file transaction, the probe function being triggered and called by the tracing module when the commitment occurs;
computer readable program code configured to obtain, when the probe function is triggered, the current file transaction placed in a stack of a memory device of the computing system;
computer readable program code configured to record a data change associated with the current file transaction;
computer readable program code configured to register, in response to recording the data change, a callback function and a reference to the data change associated with the current file transaction, wherein the callback function is automatically called by the operating system in response to the commitment of the current file transaction; and
computer readable program code configured to send, in response to the call by the operating of the callback function, the data change to a remote server.

18. The computer program product of claim 17, wherein the computer readable program code configured to determine the commitment of the current file transaction to the disk is further configured to collect input-output (I/O) data associated with the current file transaction for storage in the memory device, wherein the sent data change comprises the I/O data.

19. The computer program product of claim 17, wherein the computer readable program code configured to record the data change associated with the current file transaction is further configured to insert a breakpoint in the current file transaction using the probe function in response to the commitment.

20. The computer program product of claim 17, wherein the probe function creates a pointer to the current file transaction based upon a memory address associated with a position in the stack in the memory device where the current file transaction is placed.

21. The computer program product of claim 17, wherein the probe function calls a system register function that registers an additional callback function and an additional pointer to input-output (I/O) data collected in response to a commitment prior to the commitment of the current file transaction to the disk.

22. The computer program product of claim 17, wherein the current file transaction comprises a list of callback functions, each callback function in the list being called in response to automatic commitment of the current file transaction by the operating system.

23. The computer program product of claim 17, further comprising computer readable program code configured to:
create a first ZFS instance to support the current file transaction;
encapsulate user data into the current file transaction for the processor to send the data change; and
create a duplicate file-transaction in a second ZFS instance in response to the commitment for the processor to record the data change.

24. The computer program product of claim 17, wherein the operating system automatically passes the reference of the data change to the callback function when the callback function is called, and wherein the callback function is used to send the data change.

\* \* \* \* \*